United States Patent
Casey et al.

(10) Patent No.: US 11,087,396 B1
(45) Date of Patent: *Aug. 10, 2021

(54) CONTEXT AWARE PREDICTIVE ACTIVITY EVALUATION

(71) Applicant: Wells Fargo Bank, N.A., San Francisco, CA (US)

(72) Inventors: Mary P. Casey, Edina, MN (US); Kelly Francis Loven, Brooklyn Park, MN (US); Christopher J. Blunt, Bloomington, MN (US); Lee Ryan Haseman, Albertville, MN (US); Richard Mulvey, Woodbury, MN (US)

(73) Assignee: Wells Fargo Bank, N.A., San Francisco, CA (US)

( * ) Notice: Subject to any disclaimer, the term of this patent is extended or adjusted under 35 U.S.C. 154(b) by 23 days.

This patent is subject to a terminal disclaimer.

(21) Appl. No.: 16/531,911

(22) Filed: Aug. 5, 2019

Related U.S. Application Data (63) Continuation of application No. 15/382,142, filed on Dec. 16, 2016, now Pat. No. 10,373,248.

(51) Int. Cl.
*G06Q 40/02* (2012.01)
*G06Q 30/06* (2012.01)
(Continued)

(52) U.S. Cl.
CPC ............ *G06Q 40/02* (2013.01); *G06F 30/20* (2020.01); *G06N 7/005* (2013.01); *G06N 20/00* (2019.01);
(Continued)

(58) Field of Classification Search
CPC ...... G06Q 40/02; G06Q 20/20; G06Q 40/128; G06Q 30/0625; G06Q 20/4012;
(Continued)

(56) References Cited

U.S. PATENT DOCUMENTS 6,988,082 B1 * 1/2006 Williams ............. G06Q 40/025
705/36 T
7,440,921 B1 * 10/2008 Rieger ................. G06Q 40/025
705/35
(Continued)

FOREIGN PATENT DOCUMENTS

WO WO-2011063432 A2 5/2011

OTHER PUBLICATIONS

D.J.N. Dharwa, D.A.R. Patel A data mining with hybrid approach based transaction risk score generation model (TRSGM) for fraud detection of online financial transaction Int. J. Comput. Appl., 16 (1) (2011), pp. 18-25 (Year: 2011).*

(Continued)

*Primary Examiner* — Nathan A Mitchell
(74) *Attorney, Agent, or Firm* — Schwegman Lundberg & Woessner, P.A.

(57) ABSTRACT

Systems and techniques for context aware predictive activity evaluation are described herein. A set of transaction variables may be identified for a predicted transaction. A set of inputs may be obtained corresponding to each transaction variable of the set of transaction variables. A value may be determined for each transaction variable using the set of inputs corresponding to each transaction variable of the set of transaction variables. The value for each transaction variable may be compared to a set of transaction models to select a transaction model for the predicted transaction. A probability may be calculated that the predicted transaction will be approved using the transaction model for the predicted transaction. The probability that the predicted transaction will be approved may be displayed on a display device.

17 Claims, 5 Drawing Sheets

(51) Int. Cl.
   *H04W 4/021*   (2018.01)
   *G06Q 40/00*   (2012.01)
   *G06N 20/00*   (2019.01)
   *G06Q 20/20*   (2012.01)
   *G06N 7/00*    (2006.01)
   *G06Q 20/40*   (2012.01)
   *G06F 30/20*   (2020.01)

(52) U.S. Cl.
   CPC ......... *G06Q 20/20* (2013.01); *G06Q 20/4012* (2013.01); *G06Q 30/0625* (2013.01); *G06Q 40/128* (2013.12); *H04W 4/021* (2013.01)

(58) Field of Classification Search
   CPC .. G06N 99/005; G06N 7/005; G06F 17/5009; H04W 4/021
   See application file for complete search history.

(56) References Cited

U.S. PATENT DOCUMENTS

| | | | |
|---|---|---|---|
| 7,447,494 B2 | 11/2008 | Law et al. | |
| 7,499,889 B2 | 3/2009 | Golan | |
| 7,600,676 B1 | 10/2009 | Rados et al. | |
| 7,606,764 B1 | 10/2009 | Mancini | |
| 7,938,316 B2* | 5/2011 | Bennett | G06Q 20/20 235/376 |
| 7,970,701 B2* | 6/2011 | Lewis | G06Q 20/3829 705/38 |
| 8,660,943 B1 | 2/2014 | Chirehdast | |
| 8,783,564 B2 | 7/2014 | Calabrese et al. | |
| 9,286,608 B1* | 3/2016 | Patel | G06Q 20/10 |
| 9,311,638 B1 | 4/2016 | Daniel | |
| 9,911,110 B2* | 3/2018 | Scott | G06Q 20/325 |
| 10,068,235 B1* | 9/2018 | Boates | G06Q 20/4093 |
| 10,373,248 B1 | 8/2019 | Casey et al. | |
| 10,521,837 B1* | 12/2019 | Mossoba | G06Q 30/0623 |
| 10,706,393 B1* | 7/2020 | Kettler | G06Q 20/12 |
| 2009/0109240 A1* | 4/2009 | Englert | G06T 7/73 345/633 |
| 2009/0307086 A1 | 12/2009 | Adams et al. | |
| 2009/0319421 A1* | 12/2009 | Mathis | G06Q 20/102 705/40 |
| 2011/0016041 A1* | 1/2011 | Scragg | G06Q 40/00 705/38 |
| 2011/0208654 A1 | 8/2011 | Shuster | |
| 2011/0320291 A1 | 12/2011 | Coon | |
| 2012/0066125 A1* | 3/2012 | Ma | G06Q 20/40 705/44 |
| 2012/0295580 A1 | 11/2012 | Corner | |
| 2012/0330784 A1 | 12/2012 | Nahidipour | |
| 2013/0103956 A1 | 4/2013 | Murakami | |
| 2013/0173403 A1 | 7/2013 | Grigg et al. | |
| 2013/0282578 A1* | 10/2013 | Ma | G06Q 20/40 705/44 |
| 2014/0258118 A1* | 9/2014 | Scott | G06F 21/316 705/44 |
| 2015/0170135 A1 | 6/2015 | Fourez | |
| 2015/0379514 A1 | 12/2015 | Poole | |
| 2016/0132908 A1* | 5/2016 | von Walstrom | G06Q 30/0255 705/7.25 |
| 2018/0122004 A1* | 5/2018 | Stewart | G06Q 40/02 |
| 2018/0150816 A1* | 5/2018 | Liu | G06Q 20/202 |
| 2019/0095927 A1* | 3/2019 | Shimpi | G06N 5/025 |
| 2020/0134628 A1* | 4/2020 | Jia | G06N 20/00 |

OTHER PUBLICATIONS

"U.S. Appl. No. 15/382,142, Non Final Office Action dated Oct. 25, 2018", 15 pgs.

"U.S. Appl. No. 15/382,142, Notice of Allowance dated Mar. 26, 2019".

"U.S. Appl. No. 15/382,142, Response filed Jan. 25, 2019 to Non Final Office Action dated Oct. 25, 2018", 12 pgs.

Monzo, "Terminal decline: Why some payments fail", (May 5, 2017), 4 pgs.

Ulzheimer, John, "Why Was My Credit Card Flagged?", (Feb. 22, 2019), 3 pgs.

* cited by examiner

CONTEXT AWARE PREDICTIVE ACTIVITY EVALUATION

CROSS-REFERENCE TO RELATED APPLICATION

This application is a continuation of U.S. patent application Ser. No. 15/382,142, filed Dec. 16, 2016, now issued as U.S. Pat. No. 10,373,248, which is incorporated by reference herein in its entirety.

TECHNICAL FIELD

The present subject matter relates to the field of predictive analytics. Specifically, in some example embodiments, in providing an indication of the likelihood that a predicted activity may be successfully completed in a current context.

BACKGROUND

People are not always aware of the status of their accounts. If a person is unaware of the status of an account he/she may attempt to complete an activity that is not allowed based on the current status of the account.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

A person may be contemplating performing an activity (e.g., making a purchase, etc.) using an account (e.g., user account, checking account, etc.) held by an entity. The status of the account along with contextual factors may indicate whether or not the contemplated activity may be successfully completed using the account. The context in which an activity is attempted may influence the activity's outcome. For example, in addition to an amount of a transaction, a bank may evaluate contextual indicators such as time and place of a purchase to determine if a purchase is legitimate or fraudulent.

The person may not be aware of the status of the account or whether or not a contemplated activity may be successfully completed in the current context. Without the knowledge of account status and whether an activity may be successful in the current context, the person may attempt an activity that may be unsuccessful given the person's current account status and current context. This may lead to unnecessary processing by others involved in the activity attempt (e.g., another person, vendor, payment processor, etc.). The person may also become dissatisfied with the entity holding the account because the lack of success of the activity may have been unexpected.

Some activities of the person may be completed over a computer network using an electronic account. For example, the person may attempt to make a purchase at a retail store using a digital wallet or other form of virtual payment (e.g., a debit card, credit card, etc.). The retailer may collect the person's payment information using a computer-based point of sale terminal (or other electronic payment information collection method) and the payment information may be transmitted to a payment network that is interconnected to an entity holding the person's account.

The entity may evaluate the transaction using a variety of payment processing algorithms to determine whether the proposed transaction is acceptable given the state of the person's account and whether the proposed transaction is legitimate (e.g., likely being completed by the owner of the account, etc.). If the entity holding the account approves the transaction, the payment processor may return a message to the point of sale terminal at the retailer that the purchase may proceed. If the entity holding the account does not approve the transaction, the payment processor may return a message to the point of sale terminal at the retailer that the purchase may not proceed. These messages may not indicate to the person why the transaction was not allowed to proceed or what steps could be taken to obtain a successful result. This not only leaves the person dissatisfied, but also results in unnecessary traffic on the payment processing network for transaction that are unlikely to succeed as well and longer wait times for other people trying to make a purchase at the retailer.

The techniques presented may reduce the flow of traffic containing transactions that are unlikely to succeed on the payment network by predicting potential activity of the person and providing the person with information such as the current status of the person's account, the likelihood of success of a predicted activity, and options for increasing the likelihood of success of an activity. In addition to the reduction in unnecessary traffic, the solution may also increase the person's satisfaction with the entity holding the person's account as well as reduce wait times for others trying to complete activities.

Figure 1:
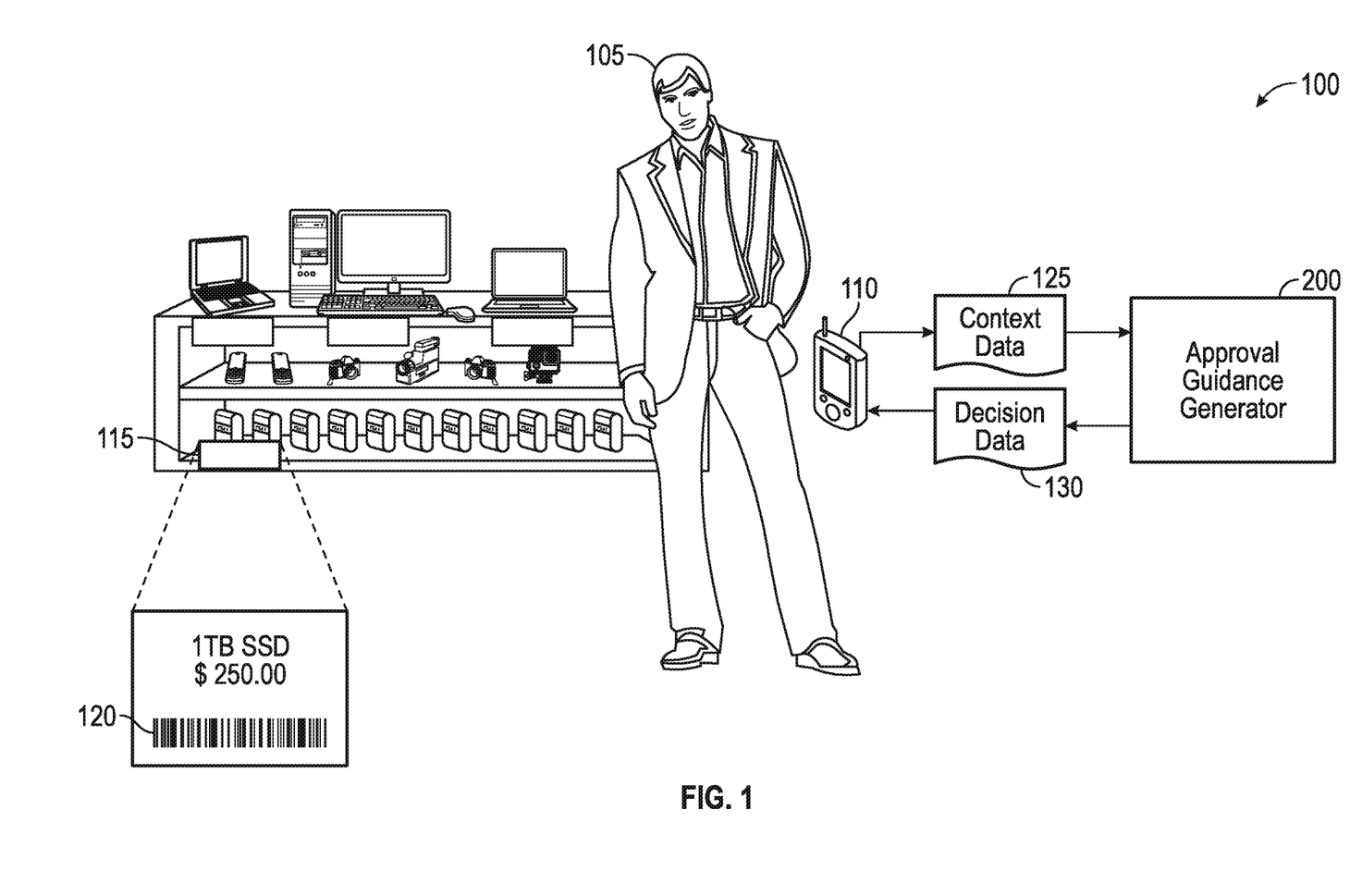
FIG. 1 illustrates an example of an environment and a system for context aware predictive activity evaluation, according to some embodiments.

FIG. 1 illustrates an example of an environment 100 and a system 200 for context aware predictive activity evaluation, according to some embodiments. The environment 100 may represent, for example, a retail store. The environment 100 may include a user 105. The user 105 may be using an electronic device 110 (e.g., smartphone, tablet, smart watch, etc.). The electronic device 110 may be communicatively coupled (e.g., over a computer network, wireless network, etc.) to an approval guidance generator 200.

The user 105 may enter a retail store with the electronic device 110. The user 105 may (or may not) have a transactional history with the retail store. For example, the user 105 may have made a number of previous purchases at the retail store or at other stores with common ownership or affiliation (e.g., a chain, franchise, etc.). The user 105 may use a variety of payment methods to pay for purchases at the retail store. For example, the user may use a credit card, debit card, check, electronic wallet, etc. to pay for purchases.

The retail store may include a variety of products. The retail store may provide signage for products, such as shelf tag 115, rather than providing individual price tags for unit of product. The shelf tag 115 may include product information such as unit price and product details. The shelf tag 115 may include a barcode 120. The barcode 120 may provide a reference to a database entry for the product containing the product information.

The electronic device 110 may be communicatively coupled to the approval guidance generator 200 which may access data from an entity holding an account (e.g., a financial account, etc.) of the user 105. The approval guidance generator 200 may receive data collected by the electronic device 110 such as, for example, context data 125. The context data 125 may include a variety of information regarding the user's 105 activity. For example, the context data 125 may include a location (e.g., GPS coordinates, business operating at the current location, etc.) of the electronic device 110, images of the user's 105 surroundings, etc. The context data 125 may also include data input by the user 105 such as, for example, an image of a product or a barcode such as barcode 120, product details, estimated transaction price totals, etc. The approval guidance generator will be discussed in additional detail in the description of FIG. 2.

The approval guidance generator may use the context data 125 in conjunction with the data from the entity to generate a likelihood of success of an activity such as, for example, a purchase. The approval guidance generator 200 may transmit decision data 130 to the electronic device 110. The decision data 130 may include a variety of data elements such as, for example, a message indicating that a transaction has been predicted and the likelihood of success of the predicted transaction, suggestions for increasing the likelihood of the transaction being successful, etc.

For example, the user may have entered a retail store at which the user frequently visits. The user may typically use a debit card associated with a checking account held by a financial institution. The approval guidance generator 200 may detect that the user 105 is at the particular retail store based on a GPS location included in the context data 125. The approval guidance generator 200 may evaluate previous transaction data from the financial institution to determine that the user 105 typically spends $112.59 (e.g., average of last three visits, rolling average over a period of time, etc.) when visiting the retailer. The user's 105 average spend at the retailer may be considered a predicted transaction based on the user's 105 prior purchase history. The approval guidance generator 200 may evaluate the state of the user's 105 account to determine that the checking account contains $99.85 and may evaluate the context data 125 and the user's 105 account data to determine that a purchased of $149.85 may be approved at the retail store. The approval guidance generator 200 may then transmit decision data 130 including a message that the predicted transaction may be successfully completed up to $149.85.

In another example, the approval guidance generator 200 may evaluate the context data 125 and data from the entity holding the user's 105 account and may determine that the predicted transaction may not be approved. For example, the predicted transaction of an average $112.59 purchase at the retailer may be unlikely to be approved because the state of the user's 105 account indicates a negative balance. The approval guidance generator 200 may transmit decision data 130 including a message that the predicted transaction is unlikely to be approved. The approval guidance generator 200 may determine that the predicted transaction is more likely to be approved if the user 105 transfers money from a savings account held by the banking institution to the checking account of the user 105. The approval guidance generator 200 may include an indication of the suggested action, transferring money between accounts, in the decision data 130.

In some examples, the context data 125 may include an image of a product and/or a barcode associated with a product. The approval guidance generator 200 may evaluate the image to determine product information such as the price of the product. The approval guidance generator 200 may use the received image and the product information to determine that the user 105 intends to make a purchase of the product. The approval guidance generator 200 may then analyze the context data 125 and entity data (e.g., bank account information, etc.) to determine the likelihood that a purchase of the product would be approved in the current context. For example, would a purchase of a laptop computer from a retail store associated with the user's 105 current location be approved given the current state of the user's 105 account. The approval guidance generator 200 may then transmit decision data 130 to the electronic device 100 of the user 105 including an indication of the likelihood of success of the predicted purchase of the product and, in the case of a low likelihood, suggestions for increasing the likelihood of success of the transaction.

Figure 2:
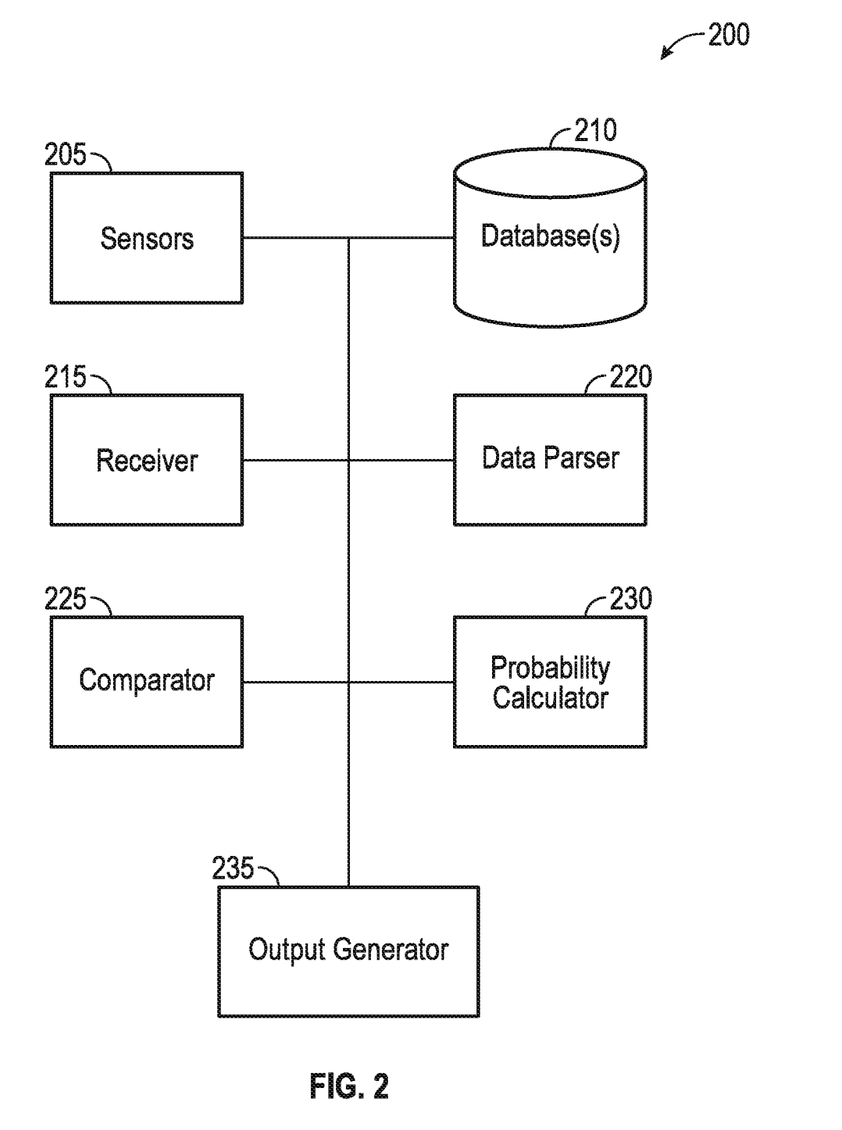
FIG. 2 illustrates a block diagram of an example of an approval guidance generator for context aware predictive activity evaluation, according to some embodiments.

FIG. 2 illustrates a block diagram of an example of an approval guidance generator 200 for context aware predictive activity evaluation, according to some embodiments. The approval guidance generator 200 may include sensors 205. The sensors 205 may include a variety of sensors such as an image sensor (e.g., a camera, etc.), a global positioning sensor (GPS), etc. In some examples, the sensors 205 may be included in an electronic device communicatively coupled to the approval guidance generator 200 such as electronic device 110 as described in FIG. 1.

The approval guidance generator 200 may be communicatively coupled to one or more databases 210. For example, the approval guidance generator 200 may be communicatively coupled via network (e.g., wireless network, cellular network, Wi-Fi, etc.) to a context database stored on an electronic device. The context database may include a variety of data describing the context in which a user of the electronic device may be contemplating an activity (e.g., considering to make a purchase, etc.). In another example, the approval guidance generator 200 may be communicatively coupled to an account database stored on a server of an entity holding an account of a user of the electronic device (e.g., the user's bank account information, etc.).

The sensors 205 and databases 210 may be communicatively coupled to a receiver 215. The receiver 215 may receive data obtained from the sensors 205 and the databases 210 to create a dataset for the transaction. The dataset may include data collected from the sensors 205 (e.g., images, GPS data, etc.) and data obtained from the databases (e.g., account balance, credit limit, daily spending limit, etc.).

The receiver 215 may work in conjunction with a data parser 220 to select and transfer appropriate data to other components for further processing. The data parser 220 may generate multiple datasets using the data provided by the receiver such as a transaction dataset, a context data set, and an account status dataset. In some examples, the data parser 220 may request additional data based on information contained in one or more of the datasets. For example, an image of a product may be included in the transaction dataset and the data parser 220 may identify the product and may access a product information library (e.g., included in the databases 210, etc.) to obtain additional information about the product (e.g., pricing information, product features, etc.). The data parser 220 may then include the additional information received in the one or more datasets.

The data parser 220 may work in conjunction with the comparator 225 to identify a predicted transaction. For example, the comparator 225 may receive product information included in one of the datasets provided in the dataset to predict that a user is contemplating purchasing the product. In some examples, additional information such as a retail store where the product is located or the user's purchase history may be used in predicting the transaction. The comparator 225 may provide the predicted transaction to the data parser 220 allowing the data parser 220 to further refine the datasets. The data parser 220 may then identify a set of transaction variables for the predicted transaction. For example, the data parser 220 may identify variables such as product price, retailer offering the product for sale, account balance, etc. for the predicted transaction.

In some examples, an image is obtained (e.g., using the receiver 215) from a camera (e.g., included in the sensors 205) of a mobile device. For example, the image may be an image of the product, an image of a barcode associated with the product, or other product identifying information. A set of product details are identified (e.g., by the data parser 220) using the image. For example, the data parser 220 may access a product information library and identify additional product information by matching the image, barcode information, or other product information identified in the image to information stored in a product information library. The predicted transaction is determined (e.g., by the comparator 225) using the set of retailer information. For example, the product information may be compared to the user's (or other users') activity to determine the user is planning to purchase the product.

In some examples, a set of geolocation data is obtained (e.g., by the receiver 215 from a GPS sensor included in the sensors 205) from a mobile device. For example, the coordinates of the user may be obtained from a GPS sensor embedded in the user's mobile device. A set of retailer information is identified (e.g., by the data parser 220) using the set of geolocation data. For example, the user's coordinates may be compared to geolocation information (e.g., from the database(s) 210) including coordinate regions for retailers to determine the set of retailer information. The predicted transaction is determined (e.g., by the comparator 225) using the set of retailer information. In an example, a transaction history for the user is obtained and the transaction history is compared to the set of retailer information to determine the predicted transaction. For example, the user's account history may indicate that the user makes frequent purchases at the identified retailer and it may be predicted that the user will make a similar purchase while at the retailer.

The data parser 220 may obtain a set of inputs corresponding to each transaction variable of the set of transaction variables. For example, the data parser 220 may obtain product information for the product identified from an image from the product library and account information for the user from the account database. In some examples, the set of inputs is obtained from a web browser tool bar. For example, a web tool bar may monitor web activity of the user and may identify that the user is visiting a website. The web browser may gather information from the visited website such as for example, products browsed, items added to an electronic shopping cart, an electronic shopping cart total, etc. and may include the gathered information in the set of inputs. In some examples, the set of inputs is obtained from a banking application. For example, the user may input information about a contemplated transaction into a mobile banking application installed on the user's mobile device. The data parser 220 may determine a value for each transaction variable using the set of inputs corresponding to each transaction variable of the set of transaction variables. For example, the data parser 220 may determine that the price for the product is $250.00 from the inputs received from the product library, a retailer selling the product is ACME Department Store from inputs received from the context database, and the user's account balance is $150.00 from the account database. The data parser 220 may provide the values to the comparator 225.

The comparator 225 may compare the value for each transaction variable to a set of transaction models to select a transaction model for the predicted transaction. A variety of selection techniques may be used by the comparator 225 in selecting the model including, for example, stepwise, cross-validation, Bayes Factors, etc. In some examples, the model may model may be a machine learned model (e.g., a regression model, etc.) that is built based upon training data of rejected or approved transactions and the transaction variables. The models may include a variety of statistical measures to which the set of variables may be compared. Additionally or alternatively, the models may include algorithms for calculating outputs such as, for example, averages, sums, differences, products, quotients, etc. using the values for each of the variables corresponding with the model. For example, a model may include a product purchase price and an account balance and may include an algorithm for subtracting the product price from the account balance to output a balance after transaction variable value. In some examples, more than one model may be selected by the comparator 225. In such examples, the comparator 225 may aggregate the models into a composite model or may compare the variable values to each model independent of one another.

In some examples, the comparator 225 may use location data collected from the sensors 205 to determine a location of the user. The comparator 225 may use geolocation data contained in the one or more databases 210 to identify entity (e.g., a retailer, etc.) information corresponding with the user's current location. The comparator 225 may compare the entity information to a user account history included in the one or more databases 210 to determine a predicted transaction for the user. For example, the user may have entered an ACME store and it may be determined that the user is likely to complete a transaction based on account history showing the user has made ten purchases at ACME in the last three months. The comparator may determine a predicted transaction total for the predicted transaction using the account history information. The comparator 225 may use a variety of calculation methods for determining the predicted transaction total such as, for example, mean, median, pattern matching, etc. For example, the user may have made ten purchases at ACME ranging between $100 and $600 over the past three months and the user's average purchase price may be calculated as $112.59. The comparator 225 may select a model for the predicted transaction involving an estimated purchase total at the determined entity.

The comparator 225 may pass the selected model(s) to the probability calculator 230. The probability calculator 230 may use the transaction models selected by the comparator 225 to calculate a probability the predicted transaction will be approved. The probability calculator 230 may use a variety of variables (e.g., transaction totals, time and date information, location information, fraud factors, etc.) and corresponding algorithms (e.g., statistical calculations, etc.) included in calculating the probability. For example, the probability calculator 230 may determine that the user's account has a balance of $99.85, an item predicted to be purchased in $125.00, and the purchase is predicted to be completed at ACME.

The probability calculator may calculate one or more component probabilities for the predicted transaction. Each component probability may evaluate an aspect of the transaction. Aspects of the transaction that may be evaluated may include, for example, purchase price to account balance, whether the transaction is being completed in a place and/or time when/where the user is expected to be making a transaction, whether a detected selling entity is reputable, etc. For example, the user's balance of $99.85 with an overdraft authorization of $50 may be compared to the predicted purchase price of $125 to calculate a probability of 1 that the transaction will be approved, history of fraud at ACME resulting in a probability of 0.7 that the transaction will be approved, and the time of the transaction compared to the user's account history resulting in a probability of 0.9 that the transaction will be approved.

The component probabilities may be combined to calculate a composite probability that the transaction may be approved. A variety of calculation techniques may be used to determine the composite probability. For example, the component probabilities of 1, 0.7, and, 9 may be multiplied to calculate a composite probability of 0.63 that the transaction will be approved. The composite probability may be compared to a threshold to determine whether the transaction is likely to be approve. For example, a probability above 0.5 may indicate the transaction is likely to be approved. If other examples, a probability above 0.75 may indicate the transaction is likely to be approved. In some embodiments, the threshold may be included in the model(s) selected by the comparator 225.

In some examples, the probability calculator 230 may determine component probabilities that negatively affect the composite probability (e.g., reduce the composite probability). In some examples, an action is identified that will increase the probability that the predicted transaction will be approved. The probability calculator 230 may work in conjunction with the comparator 225 and the data parser 220 to identify actions that the user may complete to increase the component probabilities and thus, the composite probability. For example, if the purchase price to account balance probability is calculated at 0.2 it may be identified that the user may increase the component probability for purchase price to account balance by completing a transfer between a first account and a second account.

The output generator 235 may generate output for display on a display device. The generated output may include the likelihood that the transaction will be approved. In some examples, the output generated may include constraints regarding approval of the predicted transaction. For example, the output may indicate the amount of a predicted transaction, a current account balance for the user, and a maximum transaction amount that will be approved. In some examples, the generated output may include actions that the user may complete to increase the likelihood that the transaction will be approved. In some examples, an interactive display element may be generated that initiates the action upon interaction. For example, a button object, link object, or other interactive display element may be generated allowing the user to initiate the action. In some examples, the interactive display element initiates a balance transfer between a first account and a second account. For example, the user may be presented with a button that launches a balance transfer feature of a mobile banking application that allows the user to transfer funds between a savings account and a checking account. In some examples, the interactive display element initiates a product search against a list of products corresponding to an approved vendor. For example, the user may be located at a retailer with a history of fraud and the user may be presented with a link that, when clicked, presents a list of retailers with lower incidents of fraud.

The generated output may be included in a message transmitted to a device of the user. For example, the generated output may be transmitted as one or more text messages. In some examples, the output may be transmitted to a mobile application installed on the device of the user. In some examples, the interactive display element is displayed simultaneously with the probability that the predicted transaction will be approved on the display device. In some examples, the probability that the predicted transaction will be approved in displayed on the display device using the web browser toolbar. In some examples, the probability that the predicted transaction will be approved in displayed on the display device using the banking application.

In some examples, a personal identification number is be generated corresponding to the predicted transaction based on the probability that the predicted transaction will be approved. The personal identification number corresponding to the predicted transaction is transmitted to the banking application associated with an account of the user included in a transaction model of the set of transaction models. For example, the probability may indicate that the transaction will not be approved without verification of the user's identity. The personal identification number may be transmitted to the banking application which may verify the identity of the user. In an example, the personal identification number is capable of being entered at a point of sale terminal to complete the transaction. For example, when the user initiates the transaction at a point of sale terminal at the retailer, the point of sale terminal may prompt the user for the personal identification number. Upon receiving the personal identification number, the transaction may be approved.

The sensors 205, database(s) 210, receiver 215, data parser 220, comparator 225, probability calculator 230, and output generator 235 may be implemented in hardware, software, or some combination of hardware and software. The sensors 205, database(s) 210, receiver 215, data parser 220, comparator 225, probability calculator 230, and output generator 235 may be implemented in the same computing system (e.g., a single server, a collection of servers, a cloud-based computing platform, etc.) or may be implemented in one or more other computing systems.

Examples, used herein generally discuss a purchase transaction. However, it may be understood that the techniques described may be used to evaluate a variety of activities undertaken by a user.

Figure 3:
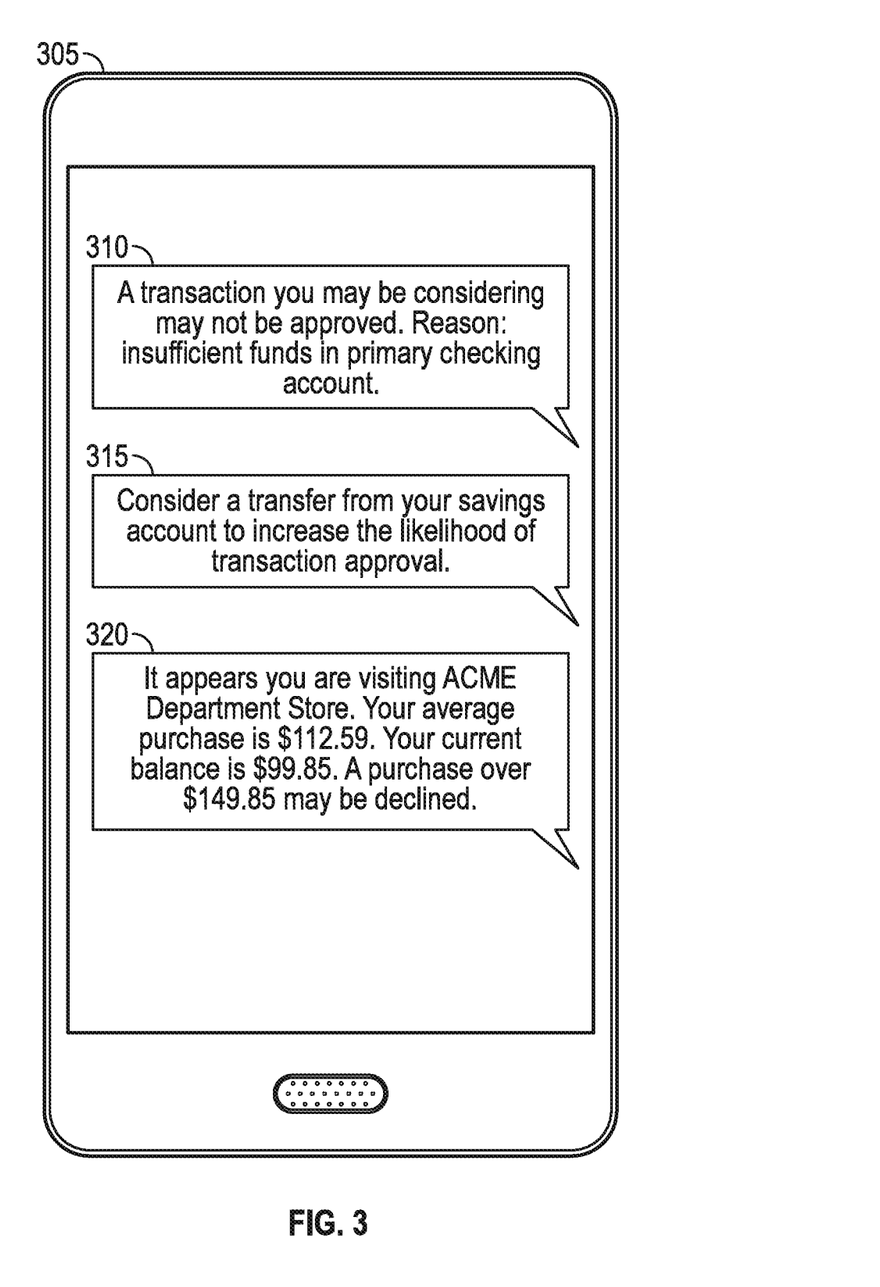
FIG. 3 illustrates an example of a graphical user interface for messaging in context aware predictive activity evaluation, according to some embodiments.

FIG. 3 illustrates an example of a graphical user interface (GUI) for messaging 300 in context aware predictive activity evaluation, according to some embodiments. The GUI 300 may be implemented using a mobile device 300. The GUI 300 may be a standalone application or a feature of another application such as, for example, a banking application, toolbar, etc. The GUI 300 may display a variety of outputs from the approval guidance generator 200 as described in FIG. 2. Examples of the output displayed include a message indicating the likelihood that a predicted transaction will be approved 310, actions that a user may complete to increase the likelihood the predicted transaction will be approved 315, and guidance regarding approval constraints of the predicted transaction 320.

It may be understood that a variety of other outputs including static and interactive graphical interface objects may be generated by the approval guidance generator 200 for display using the GUI 300. The interactive elements may include, by way of example and not limitation, buttons, hyperlinks, radio buttons, dropdown boxes, slider bars, etc.

Figure 4:
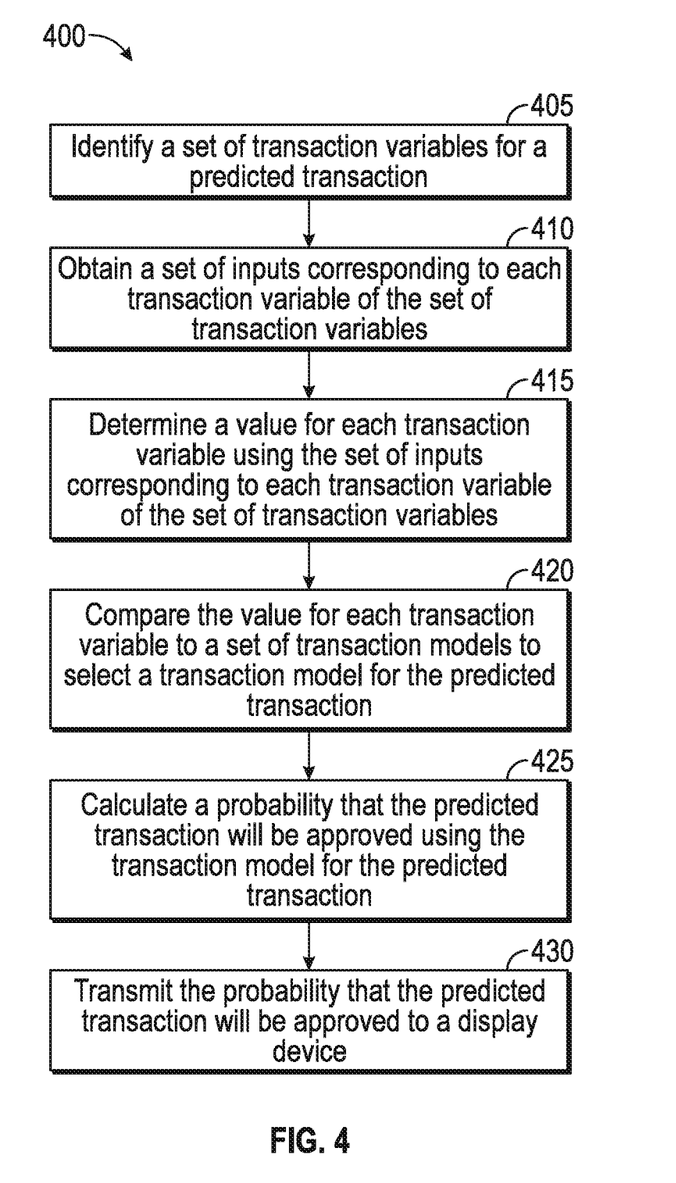
FIG. 4 illustrates a flow diagram of an example of a method for context aware predictive activity evaluation, according to some embodiments.

FIG. 4 illustrates flow diagram of an example of a method 400 for context aware predictive activity evaluation, according to some embodiments. The method 400 may perform a variety of operations of the activity guidance generator 200 as described in FIG. 2.

At operation 405, a set of transaction variables may be identified for a predicted transaction. The set of transaction variables may include a variety of variables that may indicate the substance and context of the predicted transaction. For example, the receiver 215, data parser 220, and the comparator 225 may work in conjunction to determine the predicted transaction and the set of transaction variables as described in FIG. 2.

At operation 410, a set of inputs may be obtained corresponding to each transaction variable of the set of transaction variables. In an example, the set of inputs is obtained from a web browser tool bar and wherein displaying the probability that the predicted transaction will be approved on the display device uses the web browser tool bar. In another example, the set of inputs is obtained from a banking application and wherein displaying the probability that the predicted transaction will be approved on the display device uses the banking application. For example, the inputs may include a variety of information collected from the sensors 205 and database(s) 210 as described in FIG. 2.

At operation 415, a value for each transaction variable may be determined using the set of inputs corresponding to each transaction variable of the set of transaction variables. For example, the values for each transaction variable may be determined by the data parser 220 as described in FIG. 2.

At operation 420, the value for each transaction variable may be compared to a set of transaction models to select a transaction model for the predicted transaction. In an example, each transaction model of the set of transaction models comprises a set of transaction approval algorithms. For example, the comparator 225 may compare the values to models to select the most appropriate model(s) for the predicted transaction as described in FIG. 2. For example, the comparator may use a variety of selection algorithms employing techniques such as, if-then rules, pattern matching, etc.

At operation 425, a probability may be calculated that the predicted transaction will be approved using the transaction model for the predicted transaction. For example, the probability calculator 230 may evaluate the model(s) selected by the comparator 225 using the values, algorithms, and other information included in the model(s) as described in FIG. 2.

At operation 430, the probability that the predicted transaction will be approved may be displayed on a display device. For example, the output generator 235 may generate output data and may transmit the output data to a mobile device for output on a display of the mobile device as described in FIG. 2.

In some examples, an image may be obtained from a camera of a mobile device. A set of product details may be identified using the image and the predicted transaction may be determined using the set of product details. In some examples, a set of geolocation data may be obtained from a mobile device. A set of retailer information may be identified using the set of geolocation data and the predicted transaction may be determined using the set of retailer information. In an example, a transaction history may be obtained for the user. The transaction history may be compared to the set of retailer information and the predicted transaction may be determined based on the comparison.

In some examples, an action may be identified that will increase the probability that the predicted transaction will be approved. An interactive display element may be generated that may initiate the action upon interaction. The interactive display element may be displayed simultaneous with the probability that the predicted transaction will be approved on the display device. In an example, the interactive display element initiates a balance transfer between a first account and a second account. In another example, the interactive display element initiates a product search against a list of products corresponding to an approved vendor.

In some examples, a personal identification number may be generated corresponding to the predicted transaction based on the probability that the predicted transaction will be approved. The personal identification number corresponding to the predicted transaction may be transmitted to a banking application associated with an account of a user included in a transaction model of the set of transaction models. In an example, the personal identification number is capable of being entered at a point of sale terminal to complete a transaction.

Figure 5:
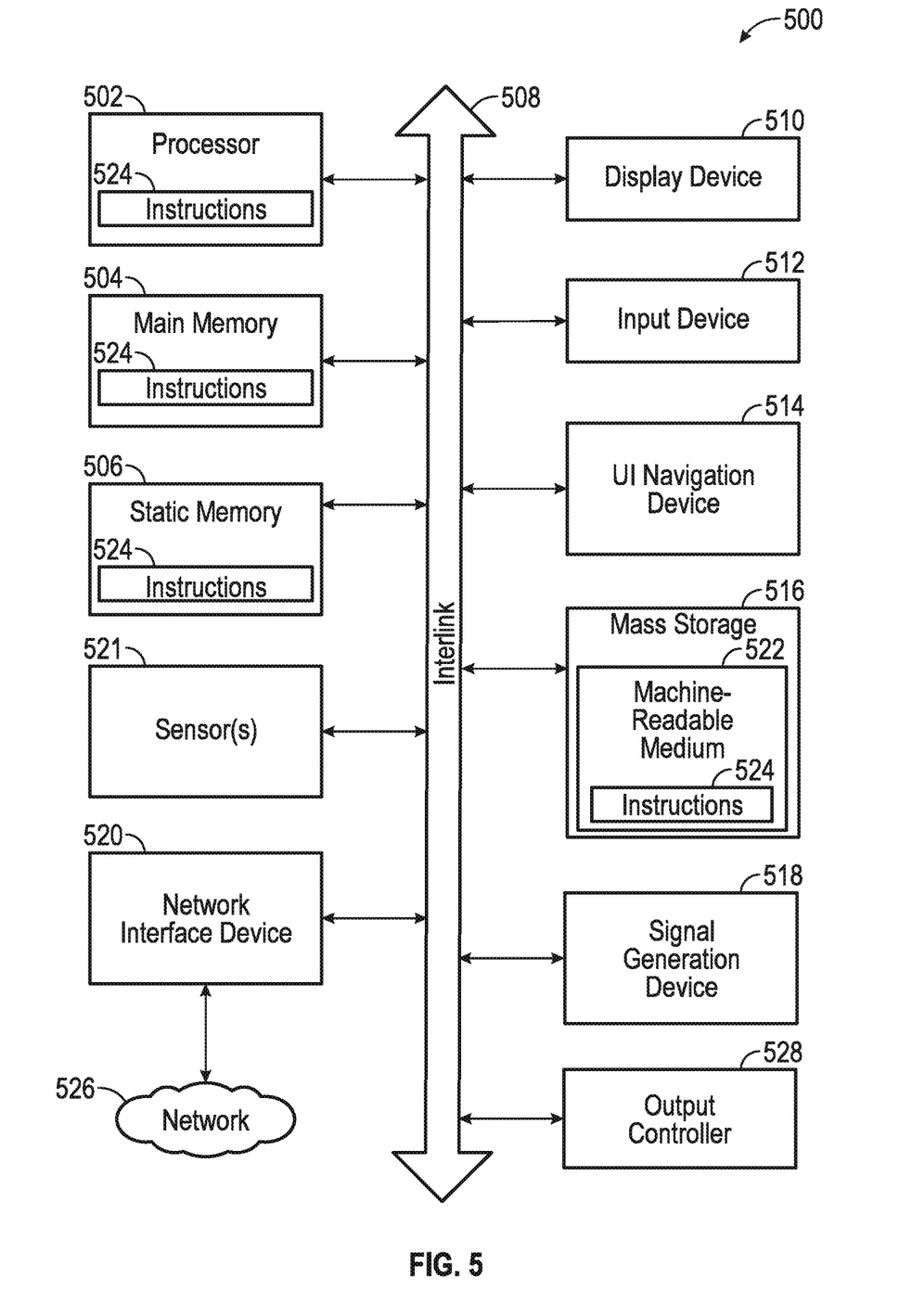
FIG. 5 is a block diagram illustrating an example of a machine upon which one or more embodiments may be implemented.

FIG. 5 illustrates a block diagram of an example machine 500 upon which any one or more of the techniques (e.g., methodologies) discussed herein may perform. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse). In an example, the display unit 510, input device 512 and UI navigation device 514 may be a touch screen display. The machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 516 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software.

Additional Notes

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system for providing computer transaction pre-approval guidance, the system comprising:
   at least one processor; and
   a memory including instructions that, when executed by the at least one processor, cause the at least one processor to perform operations to:
      obtain a set of product details for a product from a mobile device;
      determine a predicted transaction using the set of product details;
      identify a set of transaction variables for the predicted transaction;
      obtain a set of inputs corresponding to each transaction variable of the set of transaction variables;
      determine a value for each transaction variable using the set of inputs corresponding to each transaction variable of the set of transaction variables;
      compare the value for each transaction variable to a set of transaction models to select a transaction model for the predicted transaction;
      calculate, using the transaction model for the predicted transaction, a probability that the predicted transaction will be approved;
      identify an action that will increase the probability that the predicted transaction will be approved;
      generate an interactive display element that, upon interaction, initiates the action; and
      display the interactive display element simultaneous with a probability that the predicted transaction will be approved on a display device.

2. The system of claim 1, further comprising operations to:
   obtain an image from a camera of the mobile device, wherein the set of product details is identified from the image.

3. The system of claim 1, further comprising operations to:
   obtain a set of geolocation data from the mobile device;
   identify a set of retailer information using the set of geolocation data; and
   wherein determination of the predicted transaction includes using the set of retailer information.

4. The system of claim 3, further comprising operations to:
   obtain a transaction history for a user; and
   compare the transaction history to the set of retailer information, wherein determining the predicted transaction is based at least in part on the comparing.

5. The system of claim 1, further comprising operations to:
   generate, based on the probability that the predicted transaction will be approved, a personal identification number corresponding to the predicted transaction; and
   transmit the personal identification number corresponding to the predicted transaction to a banking application associated with an account of a user included in a transaction model of the set of transaction models.

6. The system of claim 5, wherein the personal identification number is capable of being entered at a point of sale terminal to complete a transaction.

7. At least one non-transitory computer readable medium including instructions for providing computer transaction pre-approval guidance that, when executed by a machine, cause the machine to perform operations to:
   obtain a set of product details for a product from a mobile device;
   determine a predicted transaction using the set of product details;
   identify a set of transaction variables for the predicted transaction;
   obtain a set of inputs corresponding to each transaction variable of the set of transaction variables;
   determine a value for each transaction variable using the set of inputs corresponding to each transaction variable of the set of transaction variables;
   compare the value for each transaction variable to a set of transaction models to select a transaction model for the predicted transaction;
   calculate, using the transaction model for the predicted transaction, a probability that the predicted transaction will be approved;
      identify an action that will increase the probability that the predicted transaction will be approved;
      generate an interactive display element that, upon interaction, initiates the action; and
   display the interactive display element simultaneous with a probability that the predicted transaction will be approved on a display device.

8. The at least one computer readable medium of claim 7, further comprising operations to:
   obtain an image from a camera of the mobile device, wherein the set of product details is identified from the image.

9. The at least one computer readable medium of claim 7, further comprising operations to:
   obtain a set of geolocation data from the mobile device;
   identify a set of retailer information using the set of geolocation data; and
   wherein determination of the predicted transaction includes using the set of retailer information.

10. The at least one computer readable medium of claim 9, further comprising operations to:

obtain a transaction history for a user; and compare the transaction history to the set of retailer information, wherein determining the predicted transaction is based at least in part on the comparing.

11. The at least one computer readable medium of claim 7, further comprising operations to:

generate, based on the probability that the predicted transaction will be approved, a personal identification number corresponding to the predicted transaction; and transmit the personal identification number corresponding to the predicted transaction to a banking application associated with an account of a user included in a transaction model of the set of transaction models.

12. The at least one machine readable medium of claim 11, wherein the personal identification number is capable of being entered at a point of sale terminal to complete a transaction.

13. A method for providing computer transaction pre-approval guidance, the method comprising:

obtaining a set of product details for a product from a mobile device;

determining a predicted transaction using the set of product details;

identifying a set of transaction variables for the predicted transaction;

obtaining a set of inputs corresponding to each transaction variable of the set of transaction variables;

determining a value for each transaction variable using the set of inputs corresponding to each transaction variable of the set of transaction variables;

comparing the value for each transaction variable to a set of transaction models to select a transaction model for the predicted transaction;

calculating, using the transaction model for the predicted transaction, a probability that the predicted transaction will be approved;

identifying an action that will increase the probability that the predicted transaction will be approved;

generating an interactive display element that, upon interaction, initiates the action; and displaying the interactive display element simultaneous with a probability that the predicted transaction will be approved on a display device.

14. The method of claim 13, further comprising:

obtaining an image from a camera of the mobile device, wherein the set of product details is identified from the image.

15. The method of claim 13, further comprising:

obtaining a set of geolocation data from the mobile device;

identifying a set of retailer information using the set of geolocation data; and wherein determining the predicted transaction includes using the set of retailer information.

16. The method of claim 15, further comprising:

obtaining a transaction history for a user; and comparing the transaction history to the set of retailer information, wherein determining the predicted transaction is based at least in part on the comparing.

17. The method of claim 13, further comprising:

generating, based on the probability that the predicted transaction will be approved, a personal identification number corresponding to the predicted transaction; and transmitting the personal identification number corresponding to the predicted transaction to a banking application associated with an account of a user included in a transaction model of the set of transaction models.

* * * * *